3,330,839
3-PYRAZOLIDINONES AND THEIR
PREPARATION
Jozef Frans Willems and Albert Lucien Poot, Wilrijk-Antwerp, and Raymond Albert Roosen, Mortsel-Antwerp, Belgium, assignors to Gevaert Photo-Producten N.V., Mortsel-Antwerp, Belgium, a Belgian company
No Drawing. Filed Feb. 10, 1964, Ser. No. 343,511
Claims priority, application Belgium, Feb. 12, 1963, 42,328
5 Claims. (Cl. 260—310)

This invention relates to new 4-di-substituted 1-aryl-3-pyrazolidinone derivatives and to a new process which is appropriate for preparing these derivatives.

It is generally known that non-substituted 1-aryl-3-pyrazolidinones as well as their 4- and/or 5-monoalkyl-substituted derivatives are converted into the corresponding 1-aryl-3-pyrazolidinones by an oxidative treatment, e.g., in aqueous or in alcoholic medium with an oxidizing agent such as oxygen, iodine, mercury (II) oxide, selenium dioxide, silver halides and sulphur. This dehydrogenation causes the loss of one hydrogen atom at the 4-position and of one hydrogen atom at the 5-position.

Such dehydrogenations are not possible with 4-dialkyl-substituted 1-aryl-3-pyrazolidinones but an oxidation in aqueous medium with the aforementioned oxidizing agents leads to a mixture of scarcely separable and identifiable products.

Surprisingly, it has now been found that an oxidative treatment of a 4-disubstituted 1-aryl-3-pyrazolidinone in alcoholic medium leads to the formation of the 5-monoalkoxy derivative or the 5-monoaryloxy derivative of said 3-pyrazolidinone, with the particular alcohol used determining the nature of the substituent on the 5-position. Hitherto, these 3-pyrazolidinone compounds could not be prepared and thus they are new. The method of preparation can be called an oxidative alkoxylation or aryloxylation. Such oxidative alkoxylations are completely new in organic preparative chemistry.

Particularly appropriate for use in a process according to the present invention are 4-disubstituted 1-aryl-3-pyrazolidinones which correspond to the following general formula:

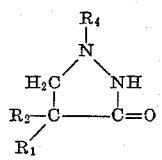

wherein:
each of $R_1$ and $R_2$ is a member selected from the group consisting of an alkyl group such as a methyl group, an ethyl group, a butyl group, a benzyl group, and an aryl group such as a phenyl group, and
$R_4$ represents an aryl group such as a phenyl group, a naphthyl group, a p-tolyl group and a haloaryl group.

These compounds and others can be prepared as described in Helv. Chim. Acta, XLIV (1961) 2060.

According to the present invention the 4-disubstituted 1-aryl-3-pyrazolidinone may be dissolved in an excess of alcohol. Under the action of oxidizing agents such as mercury (II) oxide, selenium dioxide and the like, and at temperatures in most cases between room temperature and the boiling temperature of the solvent, the reaction proceeds with the formation of the new products according to this invention.

Alcohols which are particularly appropriate for use in the present process include methanol, ethanol, propanol, isopropanol, n-butanol, benzyl alcohol, phenol and the like, so that most of the compounds according to this invention correspond to the following general formula:

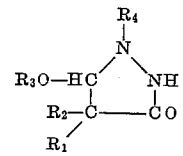

wherein
$R_1$, $R_2$ and $R_4$ have the significance as given above, and
$R_3$ is a member selected from the group consisting of an alkyl group, and an aryl group.

The reaction product obtained after the oxidative treatment in alcoholic medium can further be purified in different ways, among others by crystallization from an appropriate solvent or from an appropriate mixture of solvents such as from a mixture of benzene and hexane or from a mixture of alcohol and water.

The products according to the present invention possess reducing properties, as is apparent from the fact that they will reduce an ammoniacal silver nitrate solution. They can be used for photographic and pharmaceutic purposes and for other purposes.

The following examples illustrate the process according to the present invention and the new 4-di-substituted 1-aryl-3-pyrazolidinones of the present invention.

PREPARATION A

*1-(p-tolyl)-4,4-dimethyl-5-methoxy-3-pyrazolidinone*

(1) By oxidation of 1-(p-tolyl)-4,4-dimethyl-3-pyrazolidinone with mercury oxide in methanol.

20.4 g. of 1-(p-tolyl)-4,4-dimethyl-3-pyrazolidinone are dissolved in 200 cc. of methanol and to this solution 22 g. of mercury (II) oxide are added. The reaction mixture is heated to 90° C. and the reaction is effected at this temperature for 5 hours with continuously stirring. Thereafter, the formed mercury precipitate is filtered off and the filtrate is poured into ice-water. The precipitate obtained is sucked off, washed with water, dried and recrystallized from a mixture of benzene and hexane (1:1). Yield: 9.5 g. Melting point: 161° C.

(2) By oxidation of 1-(p-tolyl)-4,4-dimethyl-3-pyrazolidinone with selenium dioxide in methanol.

20.4 g. of 1-(p-tolyl)-4,4-dimethyl-3-pyrazolidinone are dissolved in 200 cc. of methanol and to this solution are added 5.5 g. of selenium dioxide. The further synthesis proceeds as described in 1 above. The precipitate to be filtered off, however, consists of selenium. Yield: 7.5 g. Melting point: 161° C.

(3) The oxidation is carried out as described in 1 above, with the exception that the reaction is effected for 7 hrs. at room temperature. Yield: 7.5 g. Melting point: 161° C.

PREPARATION B

*1-(p-tolyl)-4,4-dimethyl-5-ethoxy-3-pyrazolidinone*

(1) By oxidation of 1 - (p-tolyl) - 4,4-dimethyl - 3 - pyrazolidinone with mercury (II) oxide in ethanol.

20.4 g. of 1-(p-tolyl) - 4,4 - dimethyl - 3 - pyrazolidinone are dissolved in 200 cc. of ethanol and 22 g. of mercury (II) oxide are added to this solution. The reaction mass is heated to 90° C. and the reaction is effected for 5 hrs. at this temperature with continuously stirring. Thereafter, the formed mercury precipitate is filtered off and the filtrate is poured into ice-water. The precipitate obtained is sucked off, washed with water, dried and recrystallized from a mixture of benzene and n-hexane (1:2). Yield: 5 g. Melting point: 153° C.

(2) By oxidation of 1 - (p-tolyl)-4,4-dimethyl - 3-pyrazolidinone with selenium dioxide in ethanol.

20.4 g. of 1-(p-tolyl) - 4,4 - dimethyl - 3 - pyrazolidinone are dissolved in 200 cc. of ethanol and 5.5 g. of selenium dioxide are added to this solution. The further synthesis proceeds as under 1 (the precipitate to be filtered off, however, consisting of selenium). Yield: 9 g. Melting point: 153° C.

PREPARATION C

1-(p-tolyl)-4,4-dimethyl-5-(n-propoxy)-3-pyrazolidinone 20 g. of 1-(p-tolyl) - 4 - dimethyl - 3 - pyrazolidinone are dissolved in 200 cc. of n-propanol and 22 g. of mercury (II) oxide are added to this solution. The reaction is effected for 7 hrs. at room temperature. Thereafter the formed mercury precipitate is filtered off and the filtrate is poured into ice-water. The formed precipitate is sucked off, washed with water, dried, recrystallized from a mixture of benzene and n-hexane (1:2) and dried again. Yield: 6 g. Melting point: 116° C.

PREPARATION D

1-(p-tolyl)-4,4-dimethyl-5-isopropoxy-3-pyrazolidinone (1) By oxidation of 1-(p-tolyl) - 4,4 - dimethyl - 3-prazolidinone with mercury (II) oxide in isopropanol.

20 g. of 1-(p-tolyl) - 4 - dimethyl - 3 - pyrazolidinone are dissolved in 200 cc. of isopropanol and to this solution 22 g. of mercury (II) oxide are added. The reaction mixture is heated to 90° C. and the reaction is effected at this temperature for 8 hrs. with continuous stirring. Thereafter, the formed mercury precipitate is filtered off and the filtrate is poured into ice-water. The precipitate obtained is sucked off, washed with water, dried and recrystallized from ethanol. Yield: 9.4 g. Melting point: 123° C.

PREPARATION E

1-(p-tolyl)-4,4-dimethyl-5-(n-butoxy)-3-pyrazolidinone (1) By oxidation of 1-(p-tolyl) - 4,4 - dimethyl - 3-pyrazolidinone with mercury (II) oxide in n-butanol.

20 g. of 1-(p-tolyl) - 4 - dimethyl - 3 - pyrazolidinone are dissolved in 200 cc. of dry n-butanol and 22 g. of mercury (II) oxide are added to this solution. The reaction mass is heated to 90° C. and the reaction is effected for 5 hrs. at this temperature. Thereafter, the formed mercury precipitate is filtered off and the filtrate is evaporated to half its volume. By cooling the filtrate, a precipitate is formed which is sucked off. Yield: 4 g. Melting point: 185° C.

(2) By oxidation of 1-(p-tolyl)-4,4-dimethyl-3-pyrazolidinone with selenium dioxide in n-butanol.

20 g. of 1-(p-tolyl) - 4,4 - dimethyl-3-pyrazolidinone are dissolved in 200 cc. of dry n-butanol and 5.5 g. of selenium dioxide are added to this solution. The further synthesis proceeds as described in 1 above. Yield: 6 g.

PREPARATION F

1-(p-tolyl)-4,4-dimethyl-5-benzyloxy-3-pyrazolidinone (1) By oxidation of the 1-(p-tolyl)-4,4-dimethyl - 3-pyrazolidinone with mercury (II) oxide in benzylalcohol.

20 g. of 1-(p-tolyl) - 4,4 - dimethyl - 3 - pyrazolidinone are dissolved in 200 cc. of benzylalcohol and 22 g. of mercury (II) oxide are added to this solution. The reaction mass is brought to 90° C. and the reaction is effected for 5 hrs. at this temperature. Thereafter, the mercury precipitate which forms is filtered off and the filtrate cooled. The precipitate obtained is sucked off, washed with water, dried, recrystallized from ethanol and dried again. Yield: 11 g. Melting point: 178° C.

(2) By oxidation of 1-(p-tolyl) - 4,4 - dimethyl - 3-pyrazolidinone with selenium dioxide in benzylalcohol.

20 g. of 1-p-tolyl - 4,4 - dimethyl - 3 - pyrazolidinone are dissolved in 200 cc. of benzylalcohol and 5.5 g. of selenium dioxide are added to this solution. The further synthesis proceeds as described in 1 above (the precipitate to be filtered off, however, consisting of selenium). Yield: 14 g. Melting point: 178° C.

PREPARATION G

1-phenyl-4,4-dimethyl-5-methoxy-3-pyrazolidinone 19 g. of 1-phenyl-4,4-dimethyl-3-pyrazolidinone are dissolved in 200 cc. of anhydrous methanol and 22 g. of mercury (II) oxide are added to this solution. The temperature of the reaction mass is raised to 30° C. The reaction mass is cooled to 25° C. and the reaction is effected for 2 hrs. while stirring continuously. Thereafter the formed mercury precipitate is filtered off and the filtrate is evaporated until it is almost dry. The reaction mass is cooled and the precipitae formed is sucked off. This precipitate is then washed with water, dried, recrystallized from petroleum naphtha (boiling range: 90°–120° C.) and dried. Yield: 10.5 g. Melting point: 170° C.

PREPARATION H

1-phenyl-4,4-dimethyl-5-ethoxy-3-pyrazolidinone 19 g. 1-phenyl-4,4-dimethyl-3-pyrazolidinone are dissolved in 200 cc. of anhydrous ethanol and 22 g. of mercury (II) oxide are added to this solution. The reaction is effected for 5 hrs. at room temperature. Thereafter the formed mercury precipitate is filtered off and the filtrate is evaporated until it is almost dry. The reaction mass is cooled and the precipitate formed is sucked off. This precipitate is then washed with water, dried, recrystallized from petroleum naphtha (boiling range: 90°–120° C.) and dried again. Yield: 3 g. Melting point: 166° C.

PREPARATION I

1-phenyl-4,4-dimethyl-5-(n-propoxy)-3-pyrazolidinone (1) By oxidation of 1-phenyl - 4,4 - dimethyl-3-pyrazolidinone with mercury (II) oxide in n-propanol.

19 g. of 1-phenyl-4,4-dimethyl - 3 - pyrazolidinone are dissolved in 200 cc. of n-propanol and to this solution 22 g. of mercury (II) oxide are added. The reaction mixture is heated to 90° C. and the reaction is effected at this temperature for 8 hrs. with continuously stirring. Thereafter, the formed mercury precipitate is filtered off and the filtrate is poured into ice-water. The precipitate obtained is sucked off, washed with water, dried and recrystallized from n-propanol. Yield: 12.6 g. Melting point: 154° C.

(2) The reaction is carried out as described in 1 above, with the exception that the reaction is effected for 8 hrs. at room temperature. Yield: 12.1 g. Melting point: 154° C.

PREPARATION J

1-phenyl-4,4-dimethyl-5-isopropoxy-3-pyrazolidinone

By oxidation of 1-phenyl-4,4-dimethyl-3-pyrazolidinone with mercury (II) oxide in isopropanol.

19 g. of 1-phenyl-4,4-dimethyl-3-pyrazolidinone are dissolved in 200 cc. of isopropanol and to this solution 22 g. of mercury (II) oxide are added. The reaction mixture is heated to 90° C. and the reaction is effected at this temperature for 8 hrs. while continuously stirring. Thereafter, the formed mercury precipitate is filtered off and the filtrate is poured into ice-water. The precipitate obtained is sucked off, washed with water, dried and recrystallized from a mixture of benzene/n-hexane (1:1). Yield: 8.7 g. Melting point: 142° C.

PREPARATION K

1-phenyl-4,4-dimethyl-5-benzyloxy-3-pyrazolidinone (1) By oxidation of 1-phenyl-4,4-dimethyl-3-pyrazolidinone with mercury (II) oxide in benzyl alcohol.

19 g. of 1-phenyl-4,4-dimethyl-3-pyrazolidinone are dissolved in 200 cc. of benzyl alcohol and to this solution 22 g. of mercury (II) oxide are added. The reaction mixture is heated to 90° C. and the reaction is effected at this temperature for 10 hrs. while continuously stirring Thereafter, the formed mercury precipitate is filtered off and the filtrate is poured into ice-water. The precipitate obtained is sucked off, washed with water, dried and recrystallized from ethanol. Yield: 5.9 g. Melting point: 162° C.

(2) The process is carried out as described in 1 above, with the exception that the reaction is effected at room temperature. Yield: 9.5 g. Melting point: 162° C.

We claim:
1. A compound of the formula

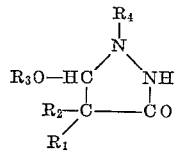

wherein each of $R_1$, $R_2$ and $R_3$ is lower alkyl, and $R_4$ is a member selected from the group consisting of phenyl, tolyl, and naphthyl.

2. A process for the preparation of a compound of the formula

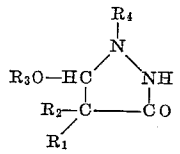

wherein each of $R_1$, $R_2$ and $R_3$ is lower alkyl, and $R_4$ is a member selected from the group consisting of phenyl, tolyl, and naphthyl comprising oxidatively treating the corresponding compound of the formula

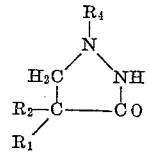

wherein each of $R_1$, $R_2$ and $R_4$ have the same significance as set forth above, in an alcoholic medium, the alcohol of said medium having the formula $R_3OH$ wherein $R_3$ has the same significance as set forth above, said treating being carried out in the presence of an oxidizing agent selected from the group consisting of mercury (II) oxide and selenium dioxide.

3. A process according to claim 2, wherein the preparation is carried out at a temperature between room temperature and the boiling temperature of the alcohol.

4. A process according to claim 2, wherein mercury (II) oxide is the oxidizing agent.

5. A process according to claim 2, wherein selenium dioxide is the oxidizing agent.

References Cited

FOREIGN PATENTS 628,285    5/1963    Belgium.

WALTER A. MODANCE, *Primary Examiner.*

NATALIE TROUSOF, *Assistant Examiner.*